Feb. 17, 1970 W. W. O'CONNOR 3,496,449
TRANSISTOR PROTECTING CIRCUIT WITH OVERVOLTAGE CONTROL AND SHORT CIRCUIT PROTECTION
Filed May 2, 1967
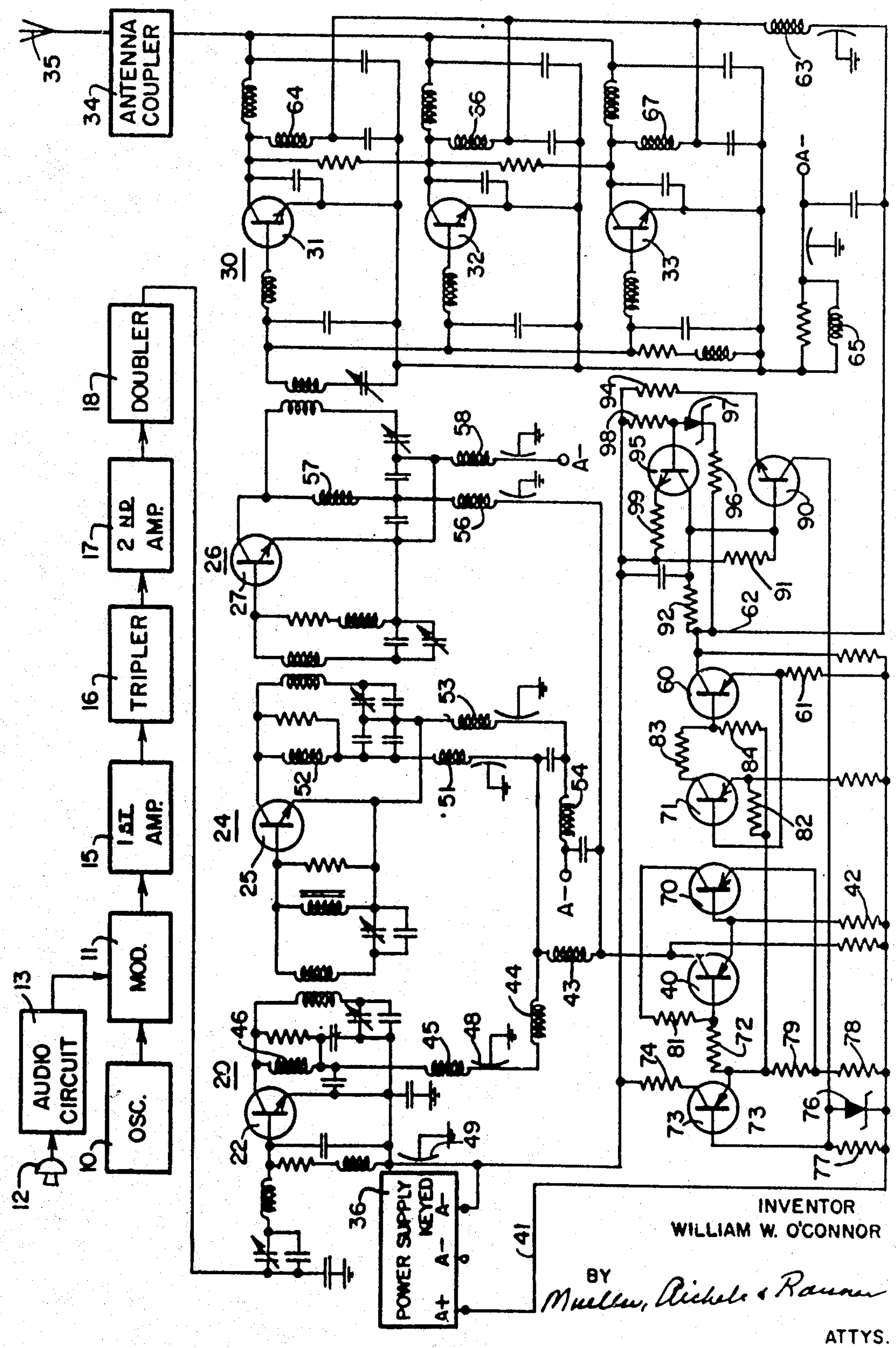
INVENTOR
WILLIAM W. O'CONNOR
BY Mueller, Aichele & Rauner
ATTYS.

United States Patent Office 3,496,449

Patented Feb. 17, 1970

3,496,449

TRANSISTOR PROTECTING CIRCUIT WITH OVER-VOLTAGE CONTROL AND SHORT CIRCUIT PROTECTION

William W. O'Connor, Lombard, Ill., assignor to Motorola, Inc., Franklin Park, Ill., a corporation of Illinois Filed May 2, 1967, Ser. No. 635,535

Int. Cl. H02j 1/04, 3/10

U.S. Cl. 323—9 5 Claims

ABSTRACT OF THE DISCLOSURE

Transistor protecting circuit including current limiter for applying current to power transistor stage, with the current limited to a value related to a reference potential. A reference regulator circuit establishes the reference potential and a short circuit detector responds to a decrease in voltage across the power transistor stage to cut off the regulator and in turn cut off the current limiter to terminate the supply of current to the power stage. An overvoltage regulator circuit responds to overvoltage applied to the power transistor stage to reduce conduction of the short circuit detector and of the regulator, and thereby decrease the current supplied by the limiter.

CROSS-REFERENCE TO RELATED APPLICATIONS

This application relates to an improvement of the circuits of my prior Patent No. 3,323,065, issued May 30, 1967, Title: Transistor Protection Circuit For Radio Transmitter, and Patent No. 3,437,838, issued April 8, 1969, Title: Dual Transistor Current Limiter.

BACKGROUND OF THE INVENTION

Semiconductor devices, such as transistors, are used in high power applications such as in the driver and power output stages of radio transmitters. To provide maximum power output, such semiconductor devices are operated at high current levels and in the event that the current or voltage increases substantially above the normal operating values, damage or destruction of the device can take place. In a radio transmitter, excessive current can be caused by a drop in the impedance of the transmitter output caused by detuning or changes in the load connected thereto. Disconnection of the antenna, or engagement of the antenna with an object such as a tree, can change the load impedance to cause a significant change in load current.

Current limiting circuits have been used to limit the current applied to high power transistor stages, and these circuits have been effective to limit the current to thereby protect the transistors under steady state conditions. Problems are presented if a short circuit occurs in the power amplifier so that the load voltage drops significantly. For such conditions it s desirable to cut off the current supplied to the driver and power output stages of the transmitter until the short circuit is removed.

Another factor which can damage the transistors of the power stages of a radio transmitter is overvoltage. For example, radio equipment including transmitters may be used on railroad cars or engines which are energized from the power supply carried on trains operating at the order of 72 volts. These power supplies are subject to operating conditions whereby large transient voltages appear on the power line. Although the transient voltages are of relatively short duration, they may have sufficient power to damage a transistor which is already operating at full rated output.

SUMMARY OF THE INVENTION

It is an object of this invention to provide a protecting circuit for a power transistor which includes a current limiter and which responds to an overvoltage applied to the transistor to cause the current limiter to reduce the applied voltage.

Another object of this invention is to provide a protecting circuit for the high power section of a radio transmitter which responds to overvoltage and to a short circuit in the high power section to cause the current limiter to terminate or reduce the flow of current thereto.

The transistor protecting circuit of the invention may be embodied in a radio transmitter having high power transistor stages with current limiters for controlling the current supplied to the stages. A reference regulator circuit provides a reference voltage for the current limiter stages with the voltage being controlled by a Zener diode. A short circuit detecting circuit responds to a drop in the voltage across the power stages and cooperates with the reference regulator to change the reference voltage so that the supply of current is decreased or cut off. An overvoltage regulator circuit including a Zener diode operates when the voltage applied to the power transistor exceeds a given value, which may result from a transient in the supply voltage. The overvoltage regulator acts to reduce conduction of the short circuit detector to in turn reduce conduction of the reference regulator. This adjusts the reference voltage so that the voltage at the output of the current limiters decreases. A plurality of current limiters for various different stages of the transmitter may be controlled by the same reference voltage, with the short circuit detector and the overvoltage regulator normally responding to the voltage at the last or output stage of the system to control the current limiters for all of the stages.

BRIEF DESCRIPTION OF THE DRAWING

The single figure of the drawing illustrates a radio transmitter with the low power stages shown in block form and the high power stages and the protecting circuit therefor shown by circuit diagrams.

DESCRIPTION OF THE PREFERRED EMBODIMENT

Referring now to the drawing, there is illustrated in the drawing a radio transmitter where all of the stages include semi-conductor devices, such as transistors and diodes. A high frequency or radio frequency signal is developed by oscillator 10 and coupled to modulator 11, which may be a phase modulator to provide a frequency modulated signal. Voice signals applied to microphone 12 are amplified and otherwise processed in audio circuit 13 and applied to the modulator. It is to be pointed out that signals other than voice signals can be used in the system. The modulated signals are amplified in first amplifier 15 and the frequency of the modulated signals is tripled in tripler 16. The level of the signals is increased by the second amplifier 17 and the frequency is further increased by doubler 18.

The frequency of the modulated signals is again doubled and the power level is increased by power doubler 20 which includes transistor 22. The output of the power doubler is applied to a predriver amplifier 24 which includes transistor 25, and the output of the predriver is coupled to the driver amplifier 26 including transistor 27. The output of the driver amplifier is coupled to the power output amplifier 30 which includes transistors 31, 32 and 33 operating in parallel. The output signal from the amplifier 30 is applied through antenna coupler 34 to antenna 35.

Operating current for the power transistors 22, 25 and 27 of the power doubler and driver stages is supplied by the current limiter transistor 40. This current supply path extends from the A+ terminal of power supply 36 through conductor 41 and resistor 42 to the emitter of transistor 40, and from the collector thereof through coils 43, 44, 45 and 46 to the collector of transistor 22. The emitter of transistor 22 is connected to the keyed A— terminal of the power supply 36. Feed-through capacitors 48 and 49 provide bypass for the power connections. Current from transistor 40 also flows through coil 43 and coils 51 and 52 to the collector of transistor 25, with the path extending from the emitter through coils 53 and 54 to the A— connection. Current from transistor 40 also flows through coils 56 and 57 to the collector of power transistor 27, and from the emitter thereof through coil 58 to the A— connection.

Current is supplied to the power transistors 31, 32 and 33 of the power output stage through current limiting transistor 60. This current path extends from the power supply through conductor 41 and resistor 61 to the emitter of transistor 60, and from the collector thereof through conductor 62, coil 63 and coil 64 to the collector of transistor 31. The emitter of transistor 31 is connected through coil 65 to the A— terminal in the power supply. Similarly, current flows from coil 63 through coil 66 to the collector of transistor 32 and from the emitter thereof through coil 65 to A—. The supply path for transistor 33 extends from coil 63 through coil 67 to the collector of the transistor and from the emitter thereof through coil 65 to A—.

The conductions of current limiting transistors 40 and 60 are controlled by control transistors 70 and 71 respectively. Considering first the circuit for controlling transistor 40, this transistor is normally saturated by bias current supplied through resistor 42 to the emitter thereof and from the base through resistor 72, the emitter to collector path of transistor 73 and resistor 74 connected to the keyed A— terminal of the power supply. Transistor 73 is normally held conducting by the bias applied to the base of this transistor by Zener diode 76. Resistor 77 is connected in parallel with Zener diode 76 to control the current level at which the Zener diode drops out of regulation. The conduction of transistor 73 controls the reference voltages provided by the resistors 78 and 79 connected to the emitter of transistor 73.

Control transistor 70 is normally biased to non-conduction since its base is connected through resistor 42 to the A+ terminal and its emitter is established at a bias potential by transistor 73 and resistors 78 and 79. Resistor 42 has a small value so that the current therethrough drawn by the transistors 22, 25 and 27 is not sufficient to drop the potential of the base electrode of transistor 70 to cause conduction. However, as the current drawn by the transistors 22, 25 and 27 increases above the normal level, the potential across resistor 42 similarly increases and transistor 70 is biased to conduction. This causes a path for flow of current from the collector of transistor 70 through resistor 81 to the base of transistor 40 which biases transistor 40 toward non-conduction. This reduces the current flow through transistor 40 to the transistors 22, 25 and 27 to thereby limit the current and prevent damage to the transistor.

The conrol transistor 71 operates to control the current through current limiting transistor 60 in the same way that transistor 70 controls transistor 40. Transistor 60 is normally saturated so that the current flow through resistor 61 to supply conductor 62 is not substantially reduced thereby. Control transistor 71 is normally cut off as the potential applied from resistor 61 to the base electrode is above the potential applied to the emitter electrode through resistor 82 from the reference voltage divider. When increased current flows through resistor 61, the potential at the base of transistor 71 drops so that this transistor starts to conduct. This causes current to flow from the collector thereof through resistor 83 to the base electrode of transistor 60, which is connected through resistor 84 to the reference voltage divider. The conduction of transistor 71 therefore tends to bias transistor 60 toward non-conduction and reduce the current flow through conductor 62 to the collectors of the transistors 31, 32 and 33.

To remove the supply current in the event that a short circuit appears in the power output stage 30, a short circuit detector including transistor 90 is provided. Transistor 90 is normally conducting because of the bias applied to the base thereof by resistors 91 and 92 which form a divider, connected between the potential on line 62 and the A— potential. Transistor 90 provides current flow from the keyed A— terminal of the power supply through resistor 94 to the Zener diode 76. When the voltage on conductor 62 drops, the base voltage of transistor 90 will similarly drop to cut off this transistor. This will reduce the current supplied to Zener diode 76 and resistor 77 so that all of the current will flow through resistor 77 and the voltage across the Zener diode will drop below the regulating level. The base voltage of regulator transistor 73 will therefore rise to cut off this transistor. This will increase the potential applied to the emitter electrodes of control transistors 70 and 71 to render these transistors conducting to cut off the current limiter transistors 40 and 60 and thereby remove or greatly reduce the current supplied to the high power transistor stages.

The transmitter of the invention may be used in an application wherein the power supply is subject to high power transients which cause large increases in the voltage applied. Such increase in voltage when applied through the current limiters to the high power transistors can damage or destroy the same. To reduce the effect of such transients, an overvoltage circuit is provided including transistor 95. The base of transistor 95 is connected through resistor 96 and Zener diode 97 to conductor 62, and through resistor 98 to the keyed A— terminal of the power supply. The Zener diode 97 blocks base current to transistor 95 when the potential on 62 is within the normal operating range. When this potential increases significantly above the operating range, the Zener diode 97 will conduct and supply base current to transistor 95 to render the same conducting. The emitter to collector path of transistor 95 in series with resistor 99 shunts bias resistor 91 connected to the base of transistor 90 to decrease the conduction of transistor 90. This decreases the current through Zener diode 76, as previously described, to decrease the conduction of transistor 73. This will change the reference voltage so that the control transistors 70 and 71 reduce the conduction of current limiting transistors 40 and 60. The current limiting transistors will thereby reduce the voltage applied to the power transistor stages to protect the same.

The system of the invention has been very effective to prevent damage to power transistors due to overvoltage applied thereto resulting from high voltage transients in the power supply. This has been used in equipment provided for railroad use and energized by the power supply provided on a train. The overvoltage circuit operates through the short circuit protecting circuit and the current limiters so that this additional protection is provided at small increase in cost and in circuit complexity.

What is claimed is:

1. A circuit for supplying current to a semiconductor device and for applying thereto a voltage within a given range including in combination, current regulator means for supplying current to the semiconductor device and having an output terminal for connection to such device, said current regulator means limiting the current and voltage supplied to the output terminal in response to a reference potential applied thereto, a voltage divider coupled to said current regulator for providing said reference potential and having a transistor in series therein, and a Zener diode connected to said transistor for controlling the conductivity thereof, voltage sensing means responsive to the voltage at said output terminal, and control means coupled to said voltage sensing means and to said voltage divider for adjusting the current through said Zener diode to thereby control the conduction of said transistor and the reference potential produced by said voltage divider in response to a voltage at said output terminal which is above the given voltage range so that said current regulating means reduces the voltage at said output terminal.

2. A circuit in accordance with claim 1 wherein said control means further includes short circuit detecting means responsive to a voltage at said output terminal below the given voltage range to adjust the current through said Zener diode to thereby control the conductivity of said transistor and the reference potential produced by said voltage divider.

3. A circuit in accordance with claim 1 wherein said voltage sensing means includes a further transistor and a further Zener diode for holding said further transistor non-conductive in response to a voltage at said output terminal in the given voltage range and causing the same to conduct when the voltage exceeds such range, and said further transistor when conducting actuates said control means to reduce the current through said Zener diode of said reference means and thereby reduce the voltage at said output terminal.

4. A circuit in accordance with claim 1 wherein said control means includes a short circuit detector responsive to a voltage at said output terminal below the given voltage range, and said short circuit detector reduces the current through said Zener diode to cut off said transistor and thereby adjust the reference potential so that said current regulator means reduces the current supplied to said output terminal.

5. A circuit in accordance with claim 4 wherein said short circuit detector includes a further transistor, and said voltage sensing means is connected to said further transistor for reducing the conductivity thereof in response to a voltage at said output terminal which exceeds the given voltage range, with said further transistor reducing the current through said Zener diode and thereby reducing the voltage at said output terminal.

References Cited

UNITED STATES PATENTS

| | | | |
|---|---|---|---|
| 3,086,163 | 4/1963 | Francois. | |
| 3,400,321 | 9/1968 | Lafuze | 317—33 X |

LEE T. HIX, Primary Examiner

A. D. PELLINEN, Assistant Examiner

U.S. Cl. X.R.

317—31; 325—151